(12) United States Patent
Zaner-Godsey et al.

(10) Patent No.: US 7,783,708 B2
(45) Date of Patent: Aug. 24, 2010

(54) ATTACHMENT BROWSER

(75) Inventors: Melora Zaner-Godsey, Seattle, WA (US); Asta Roseway, Redmond, WA (US); Eun-Kyung Chung, Redmond, WA (US); Martin J. Hall, Seattle, WA (US); Tammy L Savage, Seattle, WA (US); Hosea Frank, Brooklyn, NY (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 11/044,613

(22) Filed: Jan. 27, 2005

(65) Prior Publication Data

US 2006/0168543 A1 Jul. 27, 2006

(51) Int. Cl.
*G06F 15/16* (2006.01)
(52) U.S. Cl. ...................................... 709/206
(58) Field of Classification Search ............... 709/205, 709/206
See application file for complete search history.

(56) References Cited

U.S. PATENT DOCUMENTS

| | | | | |
|---|---|---|---|---|
| 5,765,170 | A * | 6/1998 | Morikawa | 707/200 |
| 5,799,318 | A * | 8/1998 | Cardinal et al. | 707/101 |
| 6,181,342 | B1 * | 1/2001 | Niblack | 345/635 |
| 6,405,225 | B1 * | 6/2002 | Apfel et al. | 715/210 |
| 6,546,417 | B1 * | 4/2003 | Baker | 709/206 |
| 2001/0051958 | A1 * | 12/2001 | deVries et al. | 707/511 |
| 2002/0184317 | A1 * | 12/2002 | Thankachan | 709/206 |
| 2003/0097361 | A1 * | 5/2003 | Huang et al. | 707/10 |
| 2004/0172451 | A1 * | 9/2004 | Biggs et al. | 709/206 |
| 2004/0179039 | A1 * | 9/2004 | Blattner et al. | 345/758 |
| 2004/0267729 | A1 * | 12/2004 | Swaminathan et al. | 707/3 |
| 2005/0076110 | A1 * | 4/2005 | Mathew et al. | 709/223 |
| 2005/0114456 | A1 * | 5/2005 | Mathew et al. | 709/206 |
| 2006/0031336 | A1 * | 2/2006 | Friedman et al. | 709/206 |

OTHER PUBLICATIONS

Column Sort, Dec. 2003, [online], [retrieved on Jun. 2, 2009]. Retrieved from the Internet< URL: http://web.archive.org/web/20031210103130/www.worldstart.com/tips/windows-explorer/columnsort.htm>.*
Tip Of The Day: Oct. 31, 2004, PC Today, Sandhills Publishing Company, [online], retrievable at < web.archive.org/web/20041230092732/http://www.pctoday.com/editorial/daily/dailycontent.asp?guid=&did=41846>, pp. 1-2 as printed.*

* cited by examiner

*Primary Examiner*—Philip C Lee
*Assistant Examiner*—Michael Chao
(74) *Attorney, Agent, or Firm*—Lee & Hayes, PLLC (57) ABSTRACT

Attachment browser is described. In an embodiment, an attachment browser displays a selection of communications received from multiple sources where each of the communications has an attachment. A representative image of each attachment is organized for display according to an attribute of the respective attachment, and a portion of each communication is displayed proximate an associated representative image to maintain the association of a communication and a respective attachment.

18 Claims, 8 Drawing Sheets

ATTACHMENT BROWSER

TECHNICAL FIELD

This invention relates to organizing and viewing attachments, such as an attachment to an email or other communication.

BACKGROUND

Electronic mail, also commonly referred to as "email" or "e-mail", is increasingly utilized as an electronic form of communication via the Internet. A user can send an email as a text message with optional attachments from a client device to a designated recipient. Although email is used primarily to communicate and to transfer files, Web-based email is increasingly used as a repository for pictures, video, and other types of data that is specific to a particular user. For example, a user on vacation can email his or her vacation photos to a personal email address to store the photos until returning from vacation.

Current email applications and Web-based email systems indicate whether an email includes an attachment, such as the vacation photos, by displaying an icon (e.g., a paperclip or other indicator) next to the email on the user interface display. Before opening the actual email, however, a user will not know how many attachments to the email that there are or what kind of file type(s) the attachments are, and will not be able to see or identify the content of the attachments.

Current email systems also enable a user to sort received emails by various fields associated with properties of the emails, such as the name of the sender of an email and the date and/or time an email was received. Emails can also be sorted such that emails received with attachments appear at the top of a list, while emails that do not include an attachment appear below the others in the email list on the user interface display.

These basic email list features are not sufficient to search, view, and organize attachments that may be included with received emails. Current systems can only recognize the existence of an attachment to an email. A user may not be able to locate a specific attachment unless he or she can recall and locate the email message that includes the specific attachment. The user may have to open each individual email and attachment to locate the specific attachment that he or she wants to find.

Accordingly, there is need to provide for searching, organizing, viewing, and managing the numerous attachments of varying file types that email users receive as attached files to emails received from multiple sources.

SUMMARY

Attachment browser is described herein.

In an implementation, an attachment browser displays a selection of communications received from multiple sources where each of the communications has an attachment. A representative image of each attachment is organized for display according to an attribute of the respective attachment, and a portion of each communication is displayed proximate an associated representative image to maintain the association of a communication and a respective attachment.

BRIEF DESCRIPTION OF THE DRAWINGS

The same numbers are used throughout the drawings to reference like features and components.

DETAILED DESCRIPTION

An attachment browser provides for organizing and managing attachments to communications, such as emails. The attachments can be organized for display according to attribute(s) of the attachments, rather than just being listed by conventional data associated with an email, such as the date received. With an attachment browser user interface, a user can easily view, locate, search for, and organize attachments without having to open each individual email.

Contact association is implemented to associate, or merge, user interface entities for communication. For example, an email or an attachment to an email can be associated with a frequent user contact on the user interface such that the email or attachment is automatically communicated to the user contact via any form of communication, such as instant messaging, email message, and the like.

While aspects of the described systems and methods for attachment browser and contact association can be implemented in any number of different computing systems, environments, and/or configurations, embodiments of attachment browser and contact association are described in the context of the following exemplary system architecture.

Figure 1:
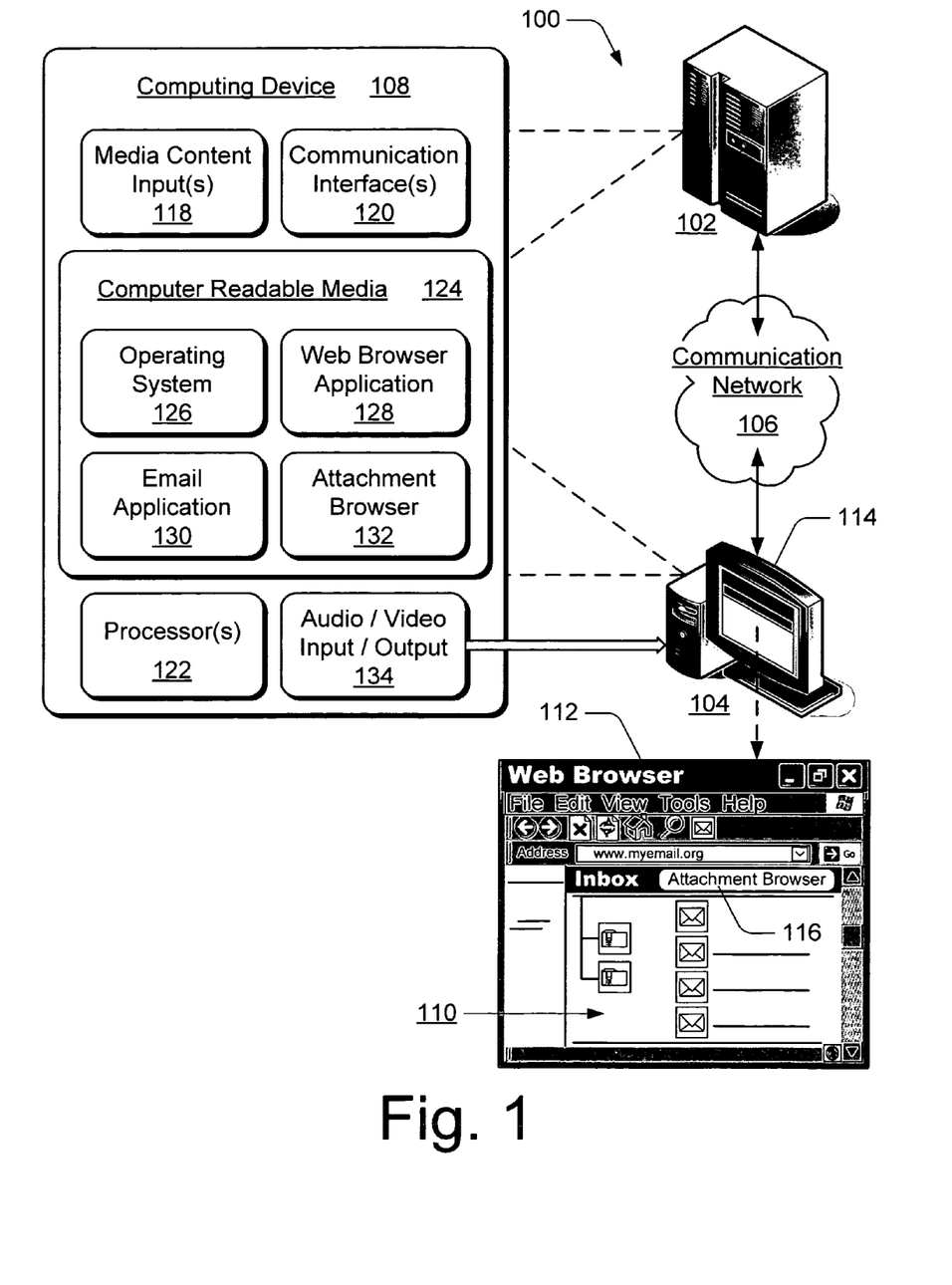
FIG. 1 illustrates an exemplary client-server system and computing device in which embodiments of attachment browser and contact association can be implemented.

FIG. 1 illustrates an exemplary client-server system 100 in which embodiments of attachment browser and contact association can be implemented. The exemplary system 100 includes a server device 102 and a client device 104 configured for communication with server device 102 via a communication network 106, such as the Internet. The server device 102 and the client device 104 can each be implemented as exemplary computing device 108, and either or both of the server device 102 and the client device 104 can implement embodiments of attachment browser and contact association. Additionally, the server device 102 and the client device 104 may each be implemented as any form of computing or electronic device with any number and combination of differing components as described below with reference to the exemplary computing environment 800 shown in FIG. 8.

In an implementation of the exemplary client-server system 100, server device 102 is a Web-based email server that client device 104 accesses via communication network 106 to receive email communications. Client device 104 can implement an email application to generate an email user interface 110 through a Web browser 112 displayed on a display device 114. The email user interface 110 and the Web browser 112 facilitate user interaction with other users and devices via the communication network 106. A user at client device 104 can initiate an attachment browser via a selectable control 116 displayed on the email user interface 110.

In this example, computing device 108 includes one or more media content inputs 118 which may include Internet Protocol (IP) inputs over which streams of media content are received via an IP-based network. Computing device 108 further includes communication interface(s) 120 which can be implemented as any one or more of a serial and/or parallel interface, a wireless interface, any type of network interface, and as any other type of communication interface.

A network interface provides a connection between computing device 108 and communication network 106 by which other electronic and computing devices can communicate data with computing device 108. Similarly, a serial and/or parallel interface provides for data communication directly between computing device 108 and the other electronic or computing devices.

Computing device 108 also includes one or more processors 122 (e.g., any of microprocessors, controllers, and the like) which process various computer executable instructions to control the operation of computing device 108, to communicate with other electronic and computing devices, and to implement embodiments of attachment browser and contact association. Computing device 108 can be implemented with computer readable media 124, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 124 provides data storage mechanisms to store various information and/or data such as software applications and any other types of information and data related to operational aspects of computing device 108. For example, an operating system 126, other application programs such as a Web browser application 128 and an email application 130, and an embodiment of attachment browser 132 can be maintained as software applications with the computer readable media 124 and executed on processor(s) 122 to implement embodiments of attachment browser and contact association. The Web browser application 128 generates the Web browser user interface 112 through which a user can interact with and browse the Web. The email application 130 facilitates email communication and can provide a local email user interface through which a user can interact with a mail service provider.

Any one or more of the application programs in computing device 108 can include an implementation of contact association. Further, although attachment browser 132 is illustrated and described as a single software application, attachment browser 132 can be implemented as several component applications distributed to each perform one or more functions of attachment browser. The attachment browser 132 may also be implemented as an integrated component of the email application 130 in computing device 108 (e.g., in server device 102 and/or in computing device 104).

Computing device 108 also includes an audio and/or video input/output 134 that provides audio and video to an audio rendering and/or display device 114, or to other devices that process, display, and/or otherwise render audio, video, and display data. Video signals and audio signals can be communicated from computing device 108 to display device 114 via an RF (radio frequency) link, S-video link, composite video link, component video link, analog audio connection, or other similar communication links.

Figure 2:
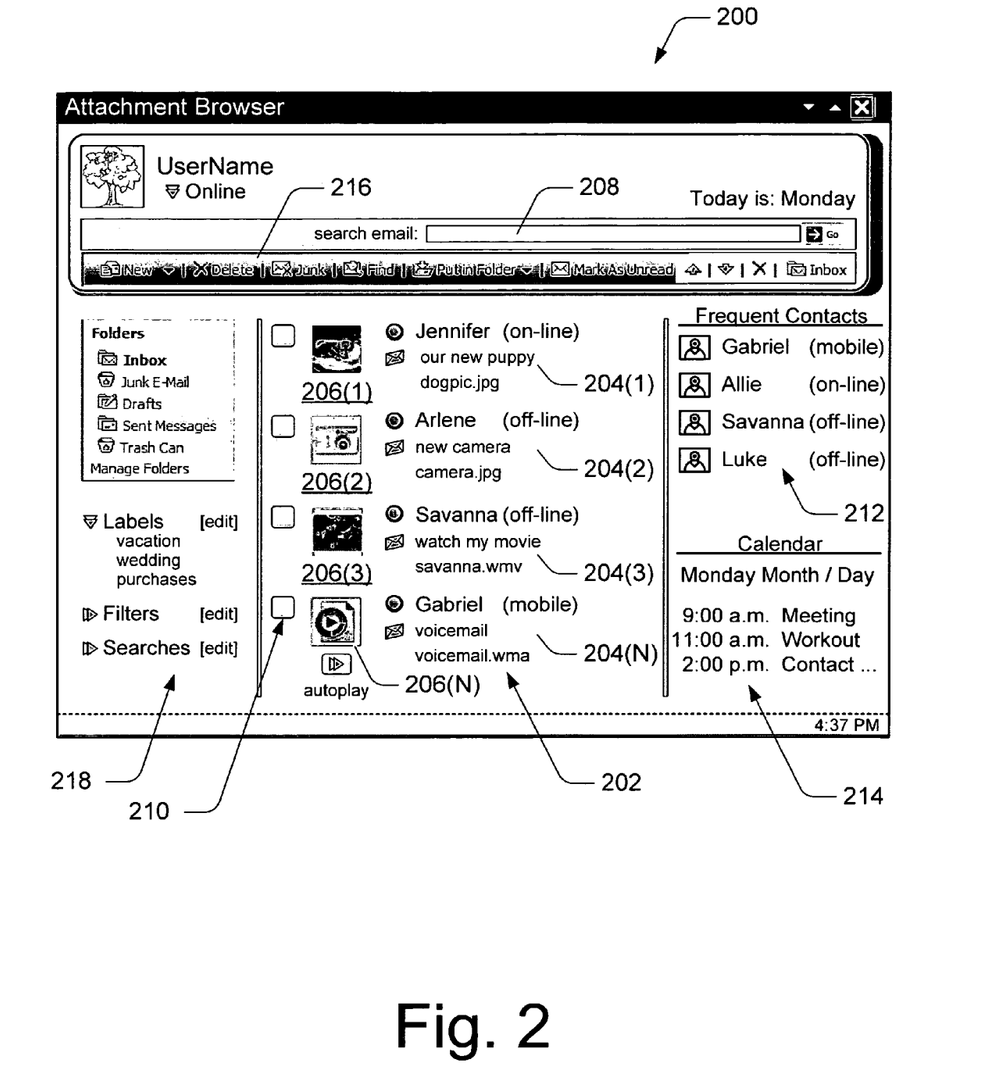
FIG. 2 illustrates an exemplary embodiment of an attachment browser.

FIG. 2 illustrates an exemplary embodiment of an attachment browser 200 which is personalized for a particular user, "UserName". The attachment browser 200 provides for organizing and managing attachments to communications, such as emails. The communications can be received from multiple sources and/or devices, such as from various individuals and from a cellular phone, game console, PDA, and/or from any other type of electronic and computing device. Further, an attachment browser can be implemented for viewing on a personal computer, cellular phone, game console, PDA, and/or for viewing with any other type of electronic or computing device.

The attachments can be organized for display according to attribute(s) of the attachments, rather than just being listed by conventional data associated with an email, such as the date received. Attributes of the attachments can include a subject of the attachments, a file type of the attachments, a size of the attachments, any user-provided search parameters, and/or any other attachment attributes. With the attachment browser 200, a user can easily view, locate, search for, and organize attachments without having to open each individual email.

The attachment browser 200 includes a selection of communications 202 in a list view which are emails 204(1-N) in this example. Each email 204(1-N) has an attachment (also referred to herein as an attached file), and each attachment has a representative image 206(1-N) displayed on the attachment browser 200. A portion of an email communication is displayed proximate an associated representative image 206(1-N) to maintain the association of a communication and a respective attachment. For example, a portion of email 204(1) includes an indication of who the email is from, a subject, and the attached file name, all of which are displayed next to representative image 206(1).

A representative image 206(1-N) (also commonly referred to as a "thumbnail") can vary according to the file format of the attachment. For example, communication 204(1) has an attached image file and the corresponding representative image 206(1) is a portion of the image. Communication 204(3) has an attached video file and the corresponding representative image 206(3) is a portion of a video frame. Communication 204(N) has an attached audio file and the corresponding representative image 206(N) is an audio identifier. Although not shown, an attached text file may have a representative image of the text file, such as an image of a portion of the text file or a text identifier. A representative image 206 for a particular attachment can also be implemented as a file format icon.

The attachment browser 200 also includes a search field 208 by which a user can search attributes of attachments to organize and manage the attachments of various communications. In addition, the attachments organized in the list view 202 can be reorganized according to any user-selectable attributes. A group of the attachments can be moved, labeled, and/or communicated to a recipient by simply selecting a respective check box 210 associated with a representative image of an attachment.

An attachment browser can also include any type of other resources, information, and selectable controls that are likely of interest and/or associated with the particular user. In this example, attachment browser 200 includes a list of the user's frequent contacts 212 which are each indicated by an image, a name, and an indication of the communication status of the contact (e.g., mobile, on-line, or off-line). The attachment browser 200 can also include any form of a time-based and/or a date-based display of information which may correspond to an environment of the user. For example, a calendar 214 indicates the date and a list of appointments that pertain to the user.

The attachment browser 200 can also include various other user-selectable controls and information, such as selectable controls on a user interface toolbar 216, and user-configurable labels, filters, and searches 218. Attachments can be filtered or searched, and then categorized by a label name which may also include color-based categorizing, text-based categorizing, and or any other type of organization and management of attached files.

Figure 3:
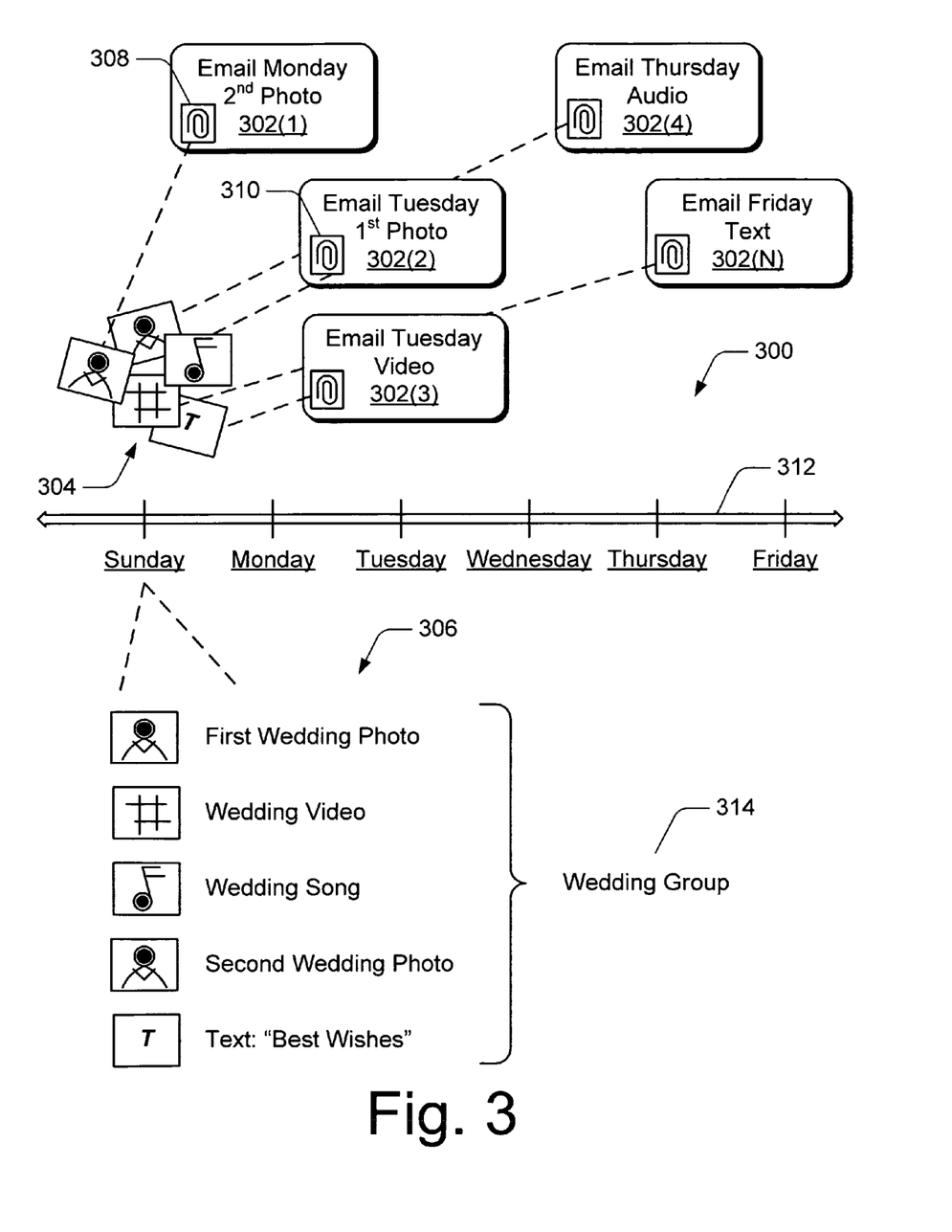
FIG. 3 illustrates an example of organizing and managing attachments which can be implemented with an attachment browser.

FIG. 3 illustrates an example 300 of organizing and managing attachments which can be implemented with an attachment browser. In this example 300, multiple communications 302(1-N) are received as emails that pertain to an event, such as a wedding, over what may be several days or weeks from many different sources. The communications each include one or more attachments (i.e., attached files) of various file formats, such as pictures, video clips, audio files, and text-based attachments. The communications can be received from multiple sources and/or devices, such as from various individuals and from a cellular phone, game console, PDA, and/or from any other type of electronic and computing device.

The attachments can be labeled, or categorized, as a "cluster" 304 and then organized by data associated with the attachments. For example, wedding photos, video clips, audio files, and text files pertaining to the wedding event can be received with associated date and time metadata. A cluster 304 is an electronic form of a shoebox, for example, that is full of pictures and memories overlapping in time and intended to be organized into a scrapbook or journal. An attachment browser provides an interface through which a user can search, sort, organize, categorize, label, store, and share the pictures and memories.

The "cluster" of attachments can be organized chronologically 306, irrespective of when the communications 302(1-N) that include the attachments are received. In this example, a first email communication 302(1) is received before a second email communication 302(2), and the first email 302(1) includes an attached photo 308 that was taken after a photo 310 that is received as an attachment to the second email 302(2). Additional email communications 302(3-N) include a video file attachment, an audio file attachment, and a text file attachment. The organized list of attachments 306 is an expanded view of the timeline 312 over which the email communications 302(1-N) are received, and is expanded to manage and organize the many attachments corresponding to the wedding event. The list of attachments 306 can be saved as a wedding group 314 for ease of future reference.

Figure 4:
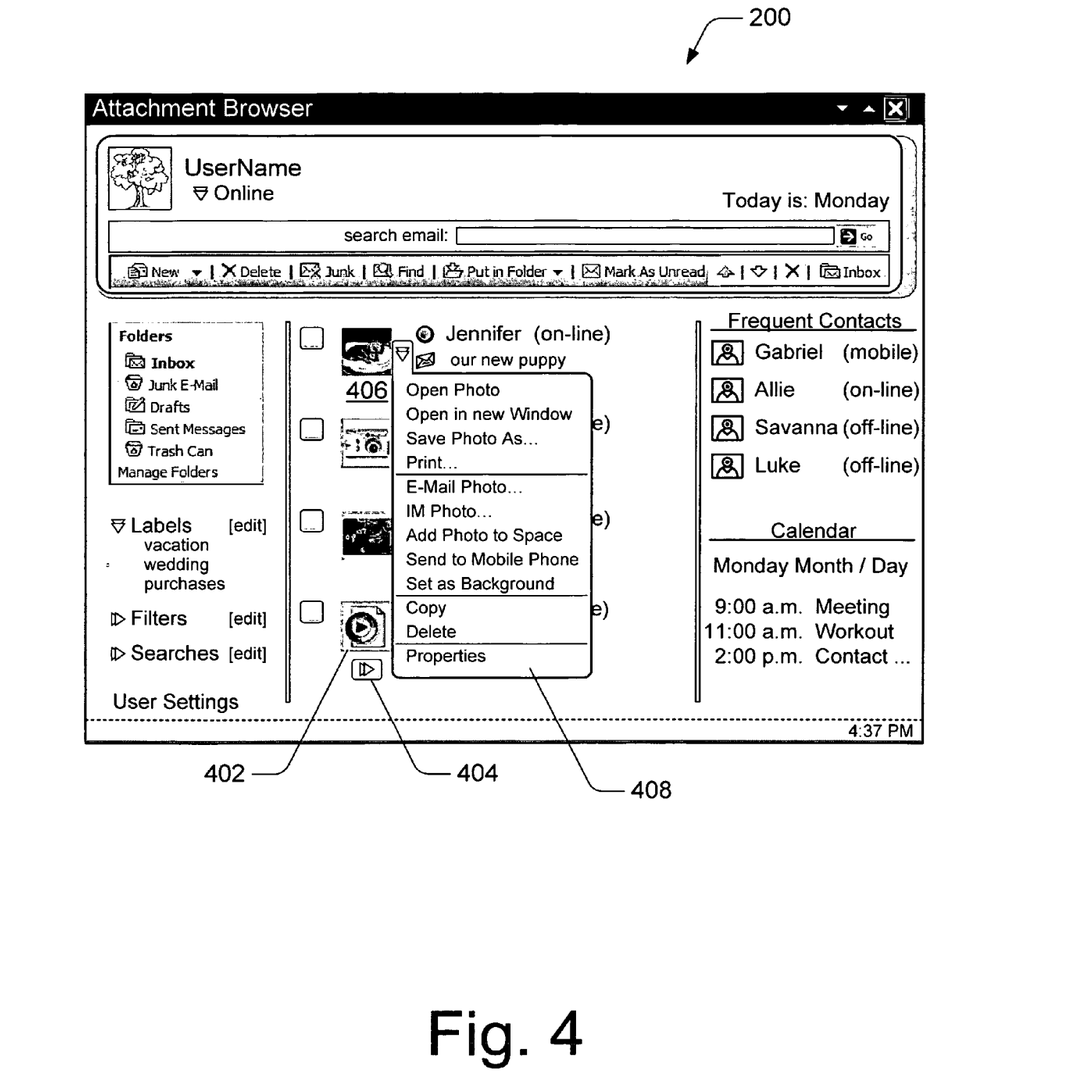
FIG. 4 further illustrates the exemplary attachment browser shown in FIG. 2.

FIG. 4 further illustrates the exemplary attachment browser 200 shown in FIG. 2. A user can select a representative image 402, such as with a mouse, to open an associated attachment directly without having to open the corresponding email communication itself. When the representative image 402 is selected to open the associated attachment, the attachment can be opened according to a determined format of the attached file. For example, clicking on a .jpg image file will open the default image viewer in the client device. Similarly, selecting an audio attachment will open an audio player to render the audio of the attached file. The presentation, or rendering, of a selected attachment via a corresponding representative image corresponds to the file type of the attachment which can be automatically determined. A representative image 402 may also have an associated auto-play selectable control 404 that, when selected, renders the corresponding attachment.

A representative image 406 can also be selected, such as with a mouse right-click command, to display a drop down menu 408 that includes any number of user-selectable actions for the attachment. For example, representative image 406 is of an attached photo, and the menu options 408 include printing the photo, copying the photo, opening the photo, and the like. Additionally, the attached photo and/or the corresponding email can be communicated to a designated recipient. The photo can also be saved in a user's space (also commonly referred to as a "blog"), or sent to a mobile communication device, such as a cellular phone or a PDA.

Methods for attachment browser and contact association, such as exemplary methods 500 and 700 described with reference to respective FIGS. 5 and 7, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
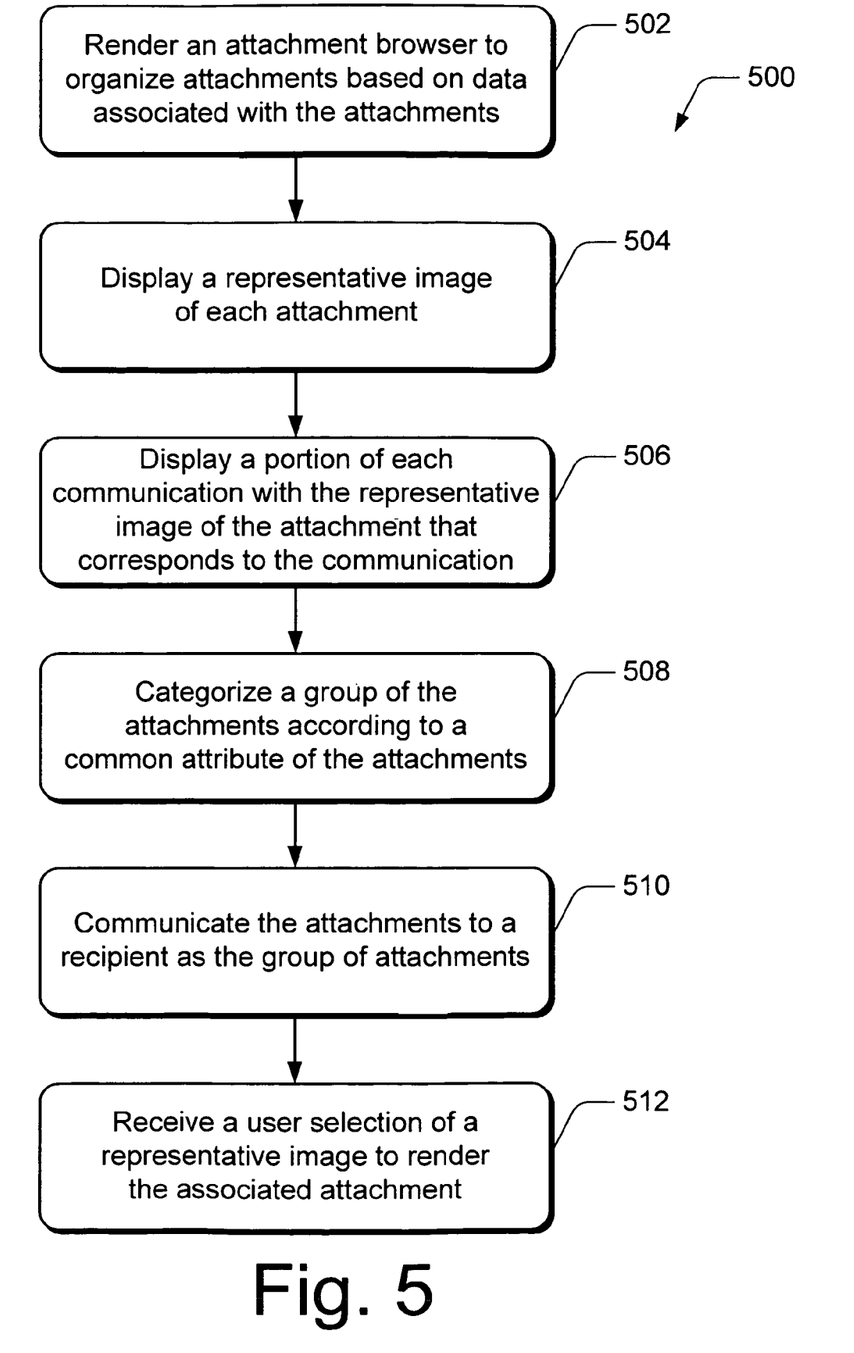
FIG. 5 is a flow diagram that illustrates an exemplary method for attachment browser.

FIG. 5 illustrates an exemplary method 500 for attachment browser. The order in which the method is described is not intended to be construed as a limitation, and any number of the described method blocks can be combined in any order to implement the method. Furthermore, the method can be implemented in any suitable hardware, software, firmware, or combination thereof.

At block 502, an attachment browser is rendered through which attachments to communications can be organized based on data associated with the attachments. The communications can be received from multiple sources and/or devices, such as from various individuals and from a cellular phone, game console, PDA, and/or from any other type of electronic and computing device. Further, an attachment browser can be implemented for viewing on a personal computer, cellular phone, game console, PDA, and/or for viewing with any other type of electronic or computing device.

At block 504, a representative image of each attachment is displayed such that the representative images are organized according to user-selected data that is associated with the respective attachments. The representative images can also be organized according to user-provided search parameters that are common to the respective attachments. For example, attachment browser 200 (FIG. 2) includes representative images 206(1-N) of attachments to email communications 204(1-N), and the representative images 206(1-N) of the attachments are organized based on data associated with the attachments.

At block 506, a portion of each communication is displayed with the representative image of the attachment that corresponds to the communication to maintain the association of the communication and the attachment. For example, portions of communications 204(1-N) are displayed proximate the representative image 206(1-N) of the attachment that corresponds to the communication. At block 508, a group of the attachments is categorized according to a common attribute of the attachments, and some of the attachments may have different file formats. For example, the attachments of email communications 204(1-N) can all have a common attribute, such as pertaining to the same event, but can all have different file formats. Email communications 204(1-2) each have an attached picture file, while email communication 204(3) has an attached video clip and email communication 204(N) has an attached audio file.

At block 510, the group of the attachments is communicated to a designated recipient. For example, the group of email communications 204(1-N) can all be labeled, saved, and communicated as a group of attachments to a designated recipient. When a group of attachments are selected, or otherwise designated, for communication as a group, the associated emails that include the attachments can optionally be included in the group communication to maintain the context of the attachments.

At block 512, a user selection of a representative image is received to render the associated attachment, and the attachment is rendered according to a format of the attachment. For example, a representative image 206 can be selected by a user, such as with a mouse input, to render the attachment corresponding to the representative image. The attachment can be rendered according to the determined file format of the attachment.

Figure 6:
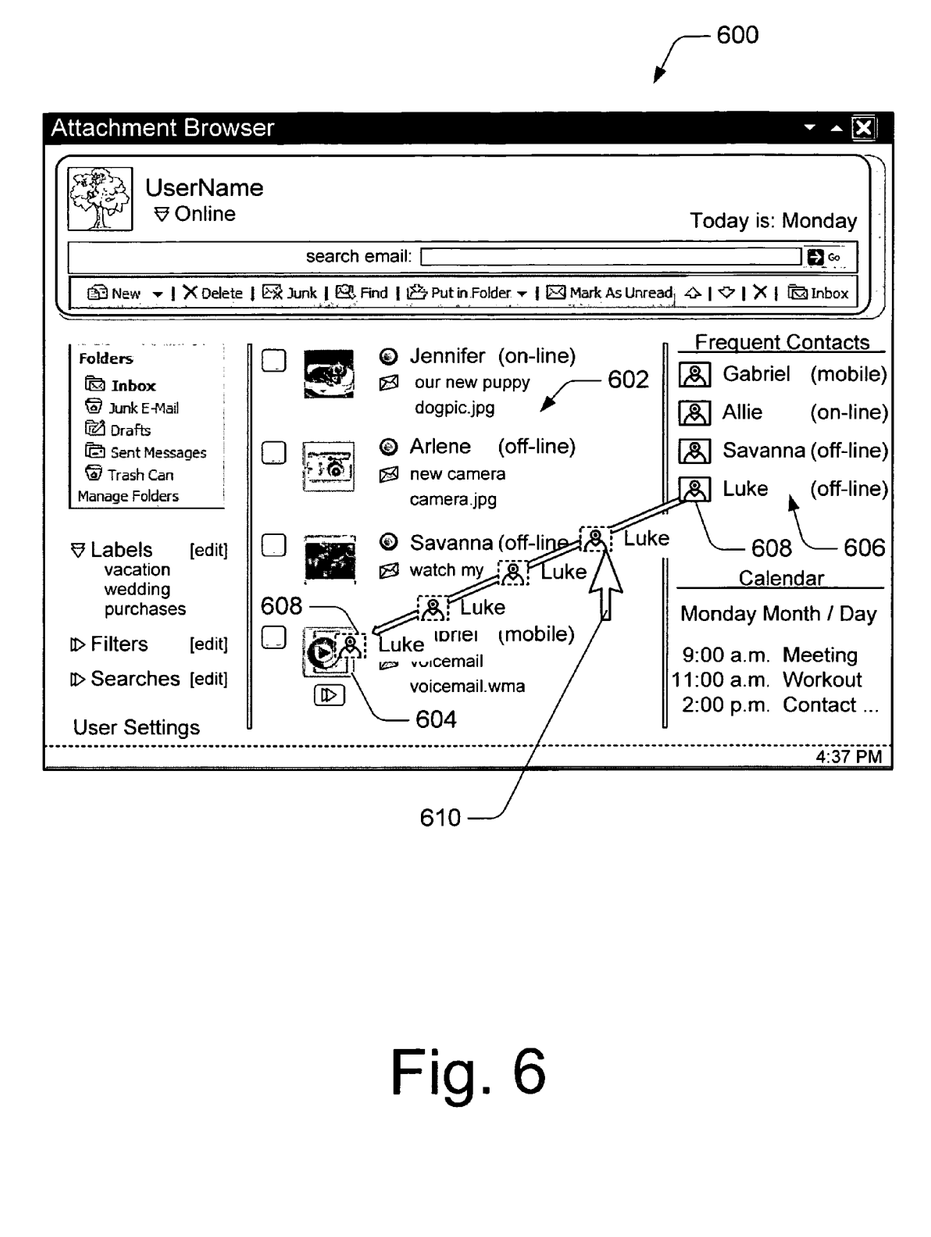
FIG. 6 illustrates an exemplary embodiment of contact association described with reference to an exemplary attachment browser.

FIG. 6 illustrates an exemplary embodiment of contact association and is described with reference to an exemplary attachment browser 600 which includes common features described with reference to the exemplary attachment browser 200 shown in FIG. 2. In this example, the attachment browser 600 includes a selection of email communications 602, each of which has an attachment, and each attachment has a representative image displayed on the attachment browser 600, such as representative image 604. The attachment browser 600 also includes a list of frequent contacts 606 that are specific to a particular user, and which are each identified by an image, a name, and an indication of the communication status of the contact (e.g., mobile, on-line, or off-line).

In an implementation of contact association, an image or other frequent contact identifier can be associated with a communication and/or a representative image of an attachment. For example, a frequent contact image 608 can be selected for drag-and-drop 610 onto representative image 604 on the attachment browser 600 to "merge" the attachment associated with the representative image 604 and the frequent user contact represented by the frequent contact image 608. Alternatively, an email communication 602 or any attachment can be selected for drag-and-drop onto a frequent contact 606 to merge the email communication and/or attachment with the frequent contact 606.

When a frequent contact 606 is merged, or associated, with an email communication 602 or attachment on the attachment browser 600 (or on any user interface), the email communication and/or attachment is communicated to the frequent contact. A communication format by which to communicate the email or attachment can be determined and the email and/or attachment can be communicated to the frequent contact according to the determined communication format. Additionally, if the associated frequent contact is designated as being on-line, the email or attachment can be communicated as an instant message to the frequent contact. Alternatively, if the associated frequent contact is designated as being off-line, the email or attachment can be communicated as an email to the frequent contact. An email or attachment can also be communicated to a user contact via any form of communication.

Figure 7:
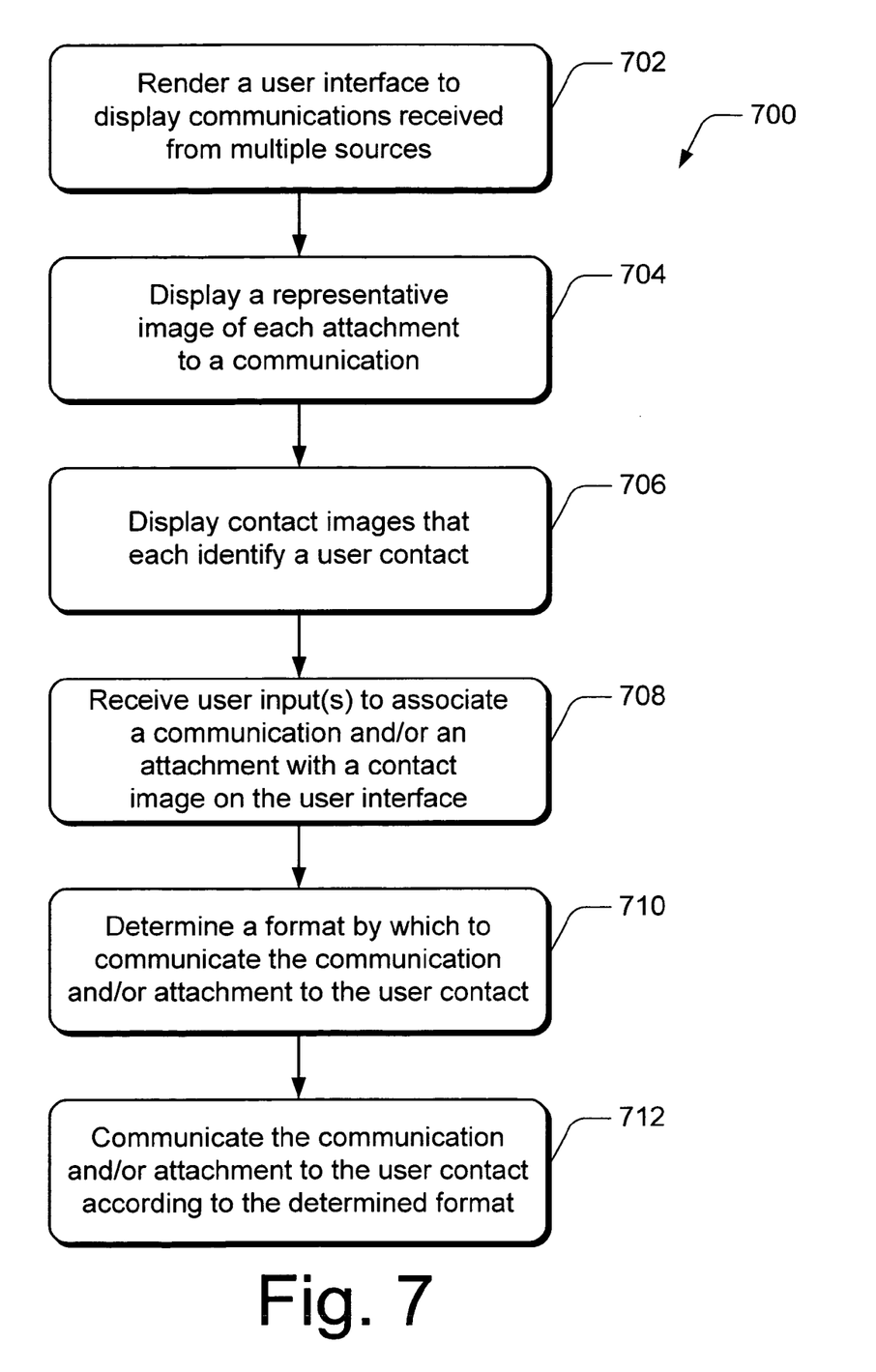
FIG. 7 is a flow diagram that illustrates an exemplary method for contact association.

FIG. 7 illustrates an exemplary method 700 for contact association. The order in which the method is described is not intended to be construed as a limitation, and any number of the described method blocks can be combined in any order to implement the method. Furthermore, the method can be implemented in any suitable hardware, software, firmware, or combination thereof.

At block 702, a user interface is rendered to display communications received from multiple sources. The communications can each have one or more attachments, and the communications are user-selectable. For example, email communications 602 (FIG. 6) are rendered for display on attachment browser 600 through which attachments to the email communications 602 can be organized for display based on data associated with the attachments.

At block 704, a representative image of each attachment is displayed such that the representative images are organized according to user-selected data that is associated with the respective attachments. For example, representative images of the attachments, such as representative image 604, are displayed on the attachment browser 600. At block 706, one or more contact images that each identify a user contact are displayed. For example, frequent contacts 606 are displayed on attachment browser 600 and include a picture image, an identifier, and text to identify a frequent contact.

At block 708, user input(s) are received to associate a communication and/or an attachment with a contact image on the user interface. For example, a user input 610 can be received to merge an email communication 602 and/or an attachment with a frequent contact 606 on the attachment browser 600. An email communication 602 and/or an attachment can be associated, or merged, with a frequent contact 606 by dragging and dropping the email communication 602 or the attachment over the frequent contact image 608 on the attachment browser 600. Alternatively, a frequent contact 606 identified by contact image 608 can be associated, or merged, with a communication 602 and/or an attachment by dragging and dropping the frequent contact image 608 over the email communication 602 and/or over the attachment on the attachment browser 600.

At block 710, a communication or attachment format is determined by which to communicate the communication and/or the attachment to the user contact. At block 712, the communication or attachment is communicated to the user contact identified by the contact image in response to the user input(s) to associate the communication or attachment with the contact image, and according to the determined communication or attachment format. Communicating the attachment or communication to the user contact can include determining that the user contact identified by the contact image is on-line, and forwarding the communication or attachment as an instant message to the user contact. Alternatively, communicating the attachment or communication to the user contact can include determining that the user contact identified by the contact image is off-line, and forwarding the communication or attachment as an email to the user contact.

Figure 8:
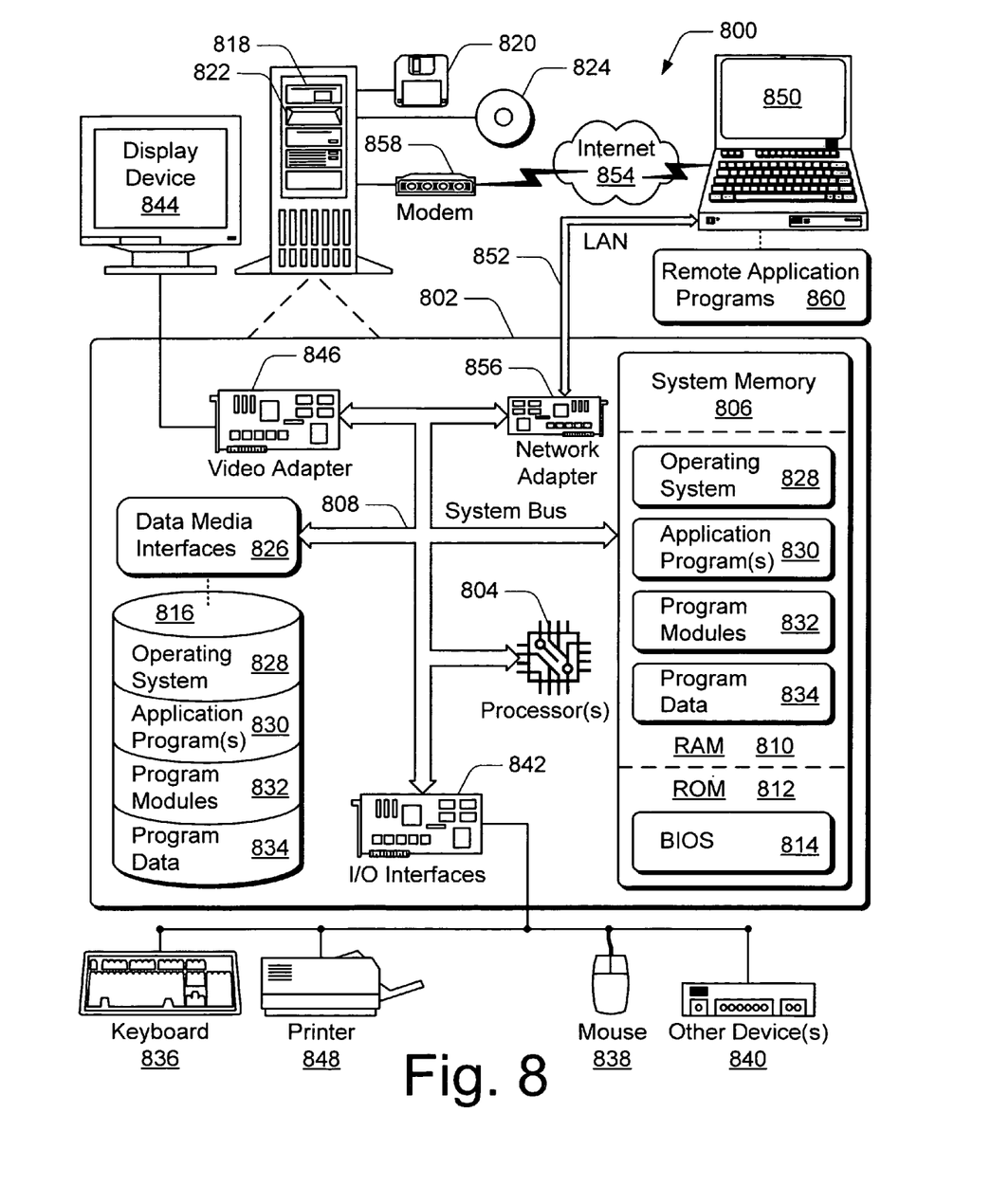
FIG. 8 illustrates exemplary computing systems, devices, and components in an environment that attachment browser and contact association can be implemented.

FIG. 8 illustrates an exemplary computing environment 800 within which attachment browser and contact association systems and methods, as well as the computing, network, and system architectures described herein, can be either fully or partially implemented. Exemplary computing environment 800 is only one example of a computing system and is not intended to suggest any limitation as to the scope of use or functionality of the architectures. Neither should the computing environment 800 be interpreted as having any dependency or requirement relating to any one or combination of components illustrated in the exemplary computing environment 800.

The computer and network architectures in computing environment 800 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 800 includes a general-purpose computing system in the form of a computing device 802. The components of computing device 802 can include, but are not limited to, one or more processors 804 (e.g., any of microprocessors, controllers, and the like), a system memory 806, and a system bus 808 that couples the various system components. The one or more processors 804 process various computer executable instructions to control the operation of computing device 802 and to communicate with other electronic and computing devices. The system bus 808 represents any number of several types of bus structures, including a memory bus or memory controller, a peripheral bus, an accelerated graphics port, and a processor or local bus using any of a variety of bus architectures.

Computing environment 800 includes a variety of computer readable media which can be any media that is accessible by computing device 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814 maintains the basic routines that facilitate information transfer between components within computing device 802, such as during start-up, and is stored in ROM 812. RAM 810 typically contains data and/or program modules that are immediately accessible to and/or presently operated on by one or more of the processors 804.

Computing device 802 may include other removable/non-removable, volatile/non-volatile computer storage media. By way of example, a hard disk drive 816 reads from and writes to a non-removable, non-volatile magnetic media (not shown), a magnetic disk drive 818 reads from and writes to a removable, non-volatile magnetic disk 820 (e.g., a "floppy disk"), and an optical disk drive 822 reads from and/or writes to a removable, non-volatile optical disk 824 such as a CD-ROM, digital versatile disk (DVD), or any other type of optical media. In this example, the hard disk drive 816, magnetic disk drive 818, and optical disk drive 822 are each connected to the system bus 808 by one or more data media interfaces 826. The disk drives and associated computer readable media provide non-volatile storage of computer readable instructions, data structures, program modules, and other data for computing device 802.

Any number of program modules can be stored on RAM 810, ROM 812, hard disk 816, magnetic disk 820, and/or optical disk 824, including by way of example, an operating system 828, one or more application programs 830, other program modules 832, and program data 834. Each of such operating system 828, application program(s) 830, other program modules 832, program data 834, or any combination thereof, may include one or more embodiments of the systems and methods described herein.

Computing device 802 can include a variety of computer readable media identified as communication media. Communication media typically embodies computer readable instructions, data structures, or program modules.

A user can interface with computing device 802 via any number of different input devices such as a keyboard 836 and pointing device 838 (e.g., a "mouse"). Other input devices 840 (not shown specifically) may include a microphone, joystick, game pad, controller, satellite dish, serial port, scanner, and/or the like. These and other input devices are connected to the processors 804 via input/output interfaces 842 that are coupled to the system bus 808, but may be connected by other interface and bus structures, such as a parallel port, game port, and/or a universal serial bus (USB).

A display device 844 (or other type of monitor) can be connected to the system bus 808 via an interface, such as a video adapter 846. In addition to the display device 844, other output peripheral devices can include components such as speakers (not shown) and a printer 848 which can be connected to computing device 802 via the input/output interfaces 842.

Computing device 802 can operate in a networked environment using logical connections to one or more remote computers, such as remote computing device 850. By way of example, remote computing device 850 can be a personal computer, portable computer, a server, a router, a network computer, a peer device or other common network node, and the like. The remote computing device 850 is illustrated as a portable computer that can include any number and combination of the different components, elements, and features described herein relative to computing device 802.

Logical connections between computing device 802 and the remote computing device 850 are depicted as a local area network (LAN) 852 and a general wide area network (WAN) 854. Such networking environments are commonplace in offices, enterprise-wide computer networks, intranets, and the Internet. When implemented in a LAN networking environment, the computing device 802 is connected to a local network 852 via a network interface or adapter 856. When implemented in a WAN networking environment, the computing device 802 typically includes a modem 858 or other means for establishing communications over the wide area network 854. The modem 858 can be internal or external to computing device 802, and can be connected to the system bus 808 via the input/output interfaces 842 or other appropriate mechanisms. The illustrated network connections are merely exemplary and other means of establishing communication link(s) between the computing devices 802 and 850 can be utilized.

In a networked environment, such as that illustrated with computing environment 800, program modules depicted relative to the computing device 802, or portions thereof, may be stored in a remote memory storage device. By way of example, remote application programs 860 are maintained with a memory device of remote computing device 850. For purposes of illustration, application programs and other executable program components, such as operating system 828, are illustrated herein as discrete blocks, although it is recognized that such programs and components reside at various times in different storage components of the computing device 802, and are executed by the one or more processors 804 of the computing device 802.

Although embodiments of attachment browser have been described in language specific to structural features and/or methods, it is to be understood that the subject of the appended claims is not necessarily limited to the specific features or methods described. Rather, the specific features and methods are disclosed as exemplary implementations of attachment browser.

The invention claimed is:

1. An attachment browser system, comprising:
one or more processors; and memory to store instructions executable by the one or more processors, the instruction to store:
a selection of email communications received from multiple computing device sources via a network adapter of a host computing device, each of the email communications having at least one attached file accessible by the host computing device;
an organized collection of attached files that have a representative image of each attached file organized for display via a video adapter according to an attachment attribute of the respective attached file, the attachment attribute including a user-defined label and at least one of a size of the attachment or a file type of the attachment, the user-defined label being used to select the attachments for the organized collection of attached files, the organized collection being maintained by the host computing device, wherein the organized collection is a cluster of attached files that selectively excludes at least one attached file based on the attachment attribute;
a message portion of each email communication displayed via a video adapter next to an associated representative image to maintain the association of an email communication and a respective attached file;
a frequent contacts portion comprising one or more frequent contact images associated with frequent user contacts; and
an association between a selected representative image and a selected frequent contact image that are superimposed via drag-and-drop, wherein the drag-and-drop causes:
merging of an attached file associated with the selected representative image and a frequent user contact represented by the selected frequent contact image;
determining a communication type based on whether the frequent user contact is on-line or off-line; and
communicating the attached file to the frequent user contact using the communication type.

2. An attachment browser system as recited in claim 1, wherein the representative images of each attached file are further organized for display according to a common subject of the representative images.

3. An attachment browser system as recited in claim 1, wherein a representative image can be selected from the organized display such that the associated attached file is rendered according to a format of the attached file.

4. An attachment browser system as recited in claim 1, further comprising a filter control configured to initiate a reorganization of the representative images according to an additional attachment attribute of the respective attached files.

5. An attachment browser system as recited in claim 1, further comprising a filter control configured to initiate a reorganization of the representative images according to an additional attachment attribute of the respective attached files and according to attached files that are received from the same source.

6. An attachment browser system as recited in claim 1, further comprising a selectable control configured to initiate communicating a group of attached files having a common label to a designated recipient, the attached files being communicated to the designated recipient without the respective communications.

7. An attachment browser system as recited in claim 1, wherein each of the attached files is a different file format, and wherein a representative image of an image file is a portion of the image, a representative image of a video file is a portion of a video frame, a representative image of an audio file is an audio identifier, and a representative image of a text file is a text identifier.

8. A method, comprising:
rendering, via a computing device, an attachment browser through which attachments to communications can be organized based on data associated with the attachments;
causing a display of representative images with the attachments;
associating the representative images according to user-selected data that is unique to the attachments to create a cluster of the images based on a time period of the content of the attachments, wherein the time period of the content is distinct from a transmission date of an attachment, the associating performed by one or more processors of the computing device;
causing a display of a message portion of each communication next to an associated representative image to maintain an association of a communication and a respective attachment;
causing a display of a frequent contacts list comprising one or more frequent contact images associated with frequent user contacts;
merging a selected attachment with a frequent user contact when a representative image associated with the selected attachment and a frequent contact image associated with the frequent user contact are superimposed via drag-and-drop, the drag-and-drop facilitating a determination of a communication type based on whether the frequent user contact is on-line or off line; and
communicating the selected attachment to the frequent user contact using the communication type.

9. A method as recited in claim 8, further comprising categorizing a group of the attachments with a user-defined label that is stored as an attachment attribute.

10. A method as recited in claim 8, further comprising categorizing a group of the attachments with a user-defined label that is stored as an attachment attribute, and communicating the group of the attachments to a designated recipient.

11. A method as recited in claim 8, wherein the user-selected data includes at least one of a subject of the attachment, a size of the attachment, a file type of the attachment, or a user-provided parameter of the attachment.

12. A method as recited in claim 8, further comprising receiving a user input to reorganize the representative images of the attachments based on additional data associated with the attachments, wherein the additional data is at least one of a subject of the attachment, a size of the attachment, a file type of the attachment, or a label of the attachment.

13. A method as recited in claim 8, further comprising categorizing a group of the attachments according to the user selected data; and transmitting the group of attachments to a recipient without the communications associated with the attachments.

14. One or more memory having stored thereon computer executable instructions that, when executed by at least one processor, direct a computing device to perform operations comprising:
rendering an attachment browser through which attachments to email communications can be organized based on data associated with the attachments;

rendering a frequent contacts list comprising one or more frequent contact images associated with frequent user contacts;

displaying representative images that are each a representative image of an attachment, wherein at least one of the representative images is an image of a contact that transmitted one of the email communications that includes an attachment, the image of the contact obtained from the frequent contact list;

clustering the representative images for display based on a user-defined theme that associates one or more attachment attributes that include at least a size of the attachment and a file type of the attachment;

merging a selected attachment with a selected contact when a representative image associated with the selected attachment and a selected image associated with the selected contact are superimposed via drag-and-drop, the drag-and-drop facilitating a determination of a communication type based on whether the selected contact is on-line or off-line;

communicating the selected attachment to the selected contact using the communication type; and displaying an identifier of each email communication next to the representative image of the attachment that corresponds to the email communication to maintain the association of the email communication and the attachment.

15. One or more memory as recited in claim 14, the operations further comprising grouping attachments having different file formats according to at least one common attribute of the attachments and in response to a user input to define the user-defined theme to organize the attachments according to the at least one common attribute.

16. One or more memory as recited in claim 14, the operations further comprising maintaining a group of the attachments under a label received as a user input and stored as a attachment attribute, the attachments being grouped according to the label.

17. One or more memory as recited in claim 16, the operations further comprising organizing a display of the representative images according to labels that are common to the respective attachments.

18. One or more memory as recited in claim 14, the operations further comprising rendering an attachment according to a format of the attachment in response to a user input that selects a representative image of the attachment.

* * * * *